Dec. 21, 1965 F. F. OFFNER 3,225,305
SYMMETRICAL TRANSISTOR AMPLIFIER WHICH IS SELF-COMPENSATING WITH RESPECT TO CHANGES IN TEMPERATURE
Original Filed April 29, 1954
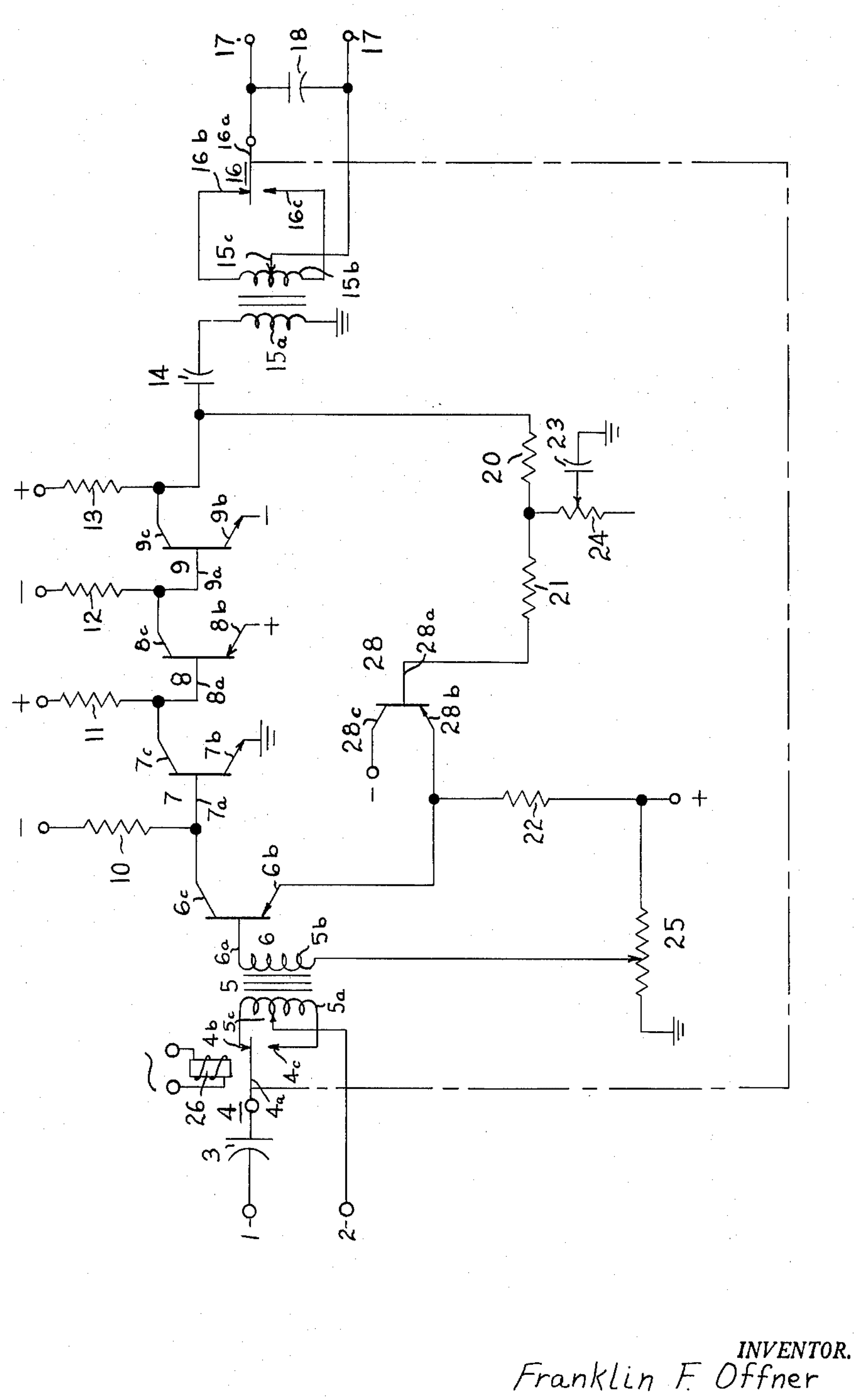
INVENTOR.
Franklin F. Offner
BY
Pierce, Scheffler & Parker
Attorneys United States Patent Office 3,225,305
Patented Dec. 21, 1965

3,225,305
SYMMETRICAL TRANSISTOR AMPLIFIER WHICH IS SELF-COMPENSATING WITH RESPECT TO CHANGES IN TEMPERATURE

Franklin F. Offner, 1890 Telegraph Road, Deerfield, Ill.
Original application Apr. 29, 1954, Ser. No. 426,325, now Patent No. 3,018,444, dated Jan. 23, 1962. Divided and this application Jan. 3, 1962, Ser. No. 164,020
1 Claim. (Cl. 330—30)

The present invention relates to electronic amplifiers employing transistors in the various stages and is a division of my co-pending application Serial No. 426,325, filed April 29, 1954, now United States Patent No. 3,018,444, granted January 23, 1962.

A principal object of the invention is to provide for increasing the stability in amplification of continuous currents and more particularly to provide for compensating out any changes in the amplification characteristic which might otherwise occur as a result of a change in ambient temperature, the desired temperature compensation being produced by a symmetrical transistor circuit within the amplifier.

One practical arrangement for the invention is illustrated in the attached drawing which shows an amplifier of the chopper type and which is provided with an inverse feedback circuit that includes the novel symmetrical transistor circuit for compensating out any change in amplification characteristic which might otherwise occur as a result of a change in ambient temperature.

With reference now to the drawing, a low-frequency signal to be amplified is applied to input terminals 1, 2. The input circuit from terminal 1 includes a condenser 3 which functions to remove any direct current component from the input signal, and the vibrator blade *4a* of a commutating switch 4 which operates between and alternately engages fixed contacts *4b*, *4c*. The latter are connected to the terminal ends of the primary winding *5a* of transformer 5. The input circuit from terminal 2 leads to a mid-tap *5c* on the transformer primary *5a*. Thus, as blade *4a* alternately engages fixed contacts *4b*, *4c*, the input is applied in alternation to the two halves of the transformer primary *5a*.

One side of secondary *5b* is connected to the input base *6a* of a P-N-P junction type transistor 6. The emitter electrode is designated *6b* and the collector electrode *6c*. Succeeding amplifier stages consist of alternate N-P-N and P-N-P transistors 7, 8 and 9, the N-P-N transistors being 7 and 9 and the P-N-P transistors being 6 and 8. The collector *6c* of transistor 6 includes a load resistor 10 to supply operating negative potential from a suitable source. In a similar manner, collector *8c* of the other P-N-P transistor includes a load resistor 12 to supply operating negative potential, and collectors *7c* and *9c* of the N-P-N transistors 7 and 9 include load resistors 11 and 13 respectively to supply operating positive potential from a suitable source. To give the proper operating potential on transistors 8 and 9, their emitters *8b* and *9b* are returned to positive and negative potentials, respectively.

The output of transistor 9 is fed through condenser 14 to the primary *15a* of output transformer 15. Another commutating switch 16 including a vibrator blade *16a* operating between and alternatingly engaging fixed contacts *16b*, *16c* connected to the ends of transformer secondary *15b* serves to reconvert the output substantially to a facsimile of the input, but amplified. The blade 16 is connected over a lead to one of the two output terminals 17 and from a center tap *15c* on transformer secondary *15b* another lead extends to the other of the output terminals. A condenser 18 connected in parallel with the output terminals 17 serves to remove any switching transients that may be present in the output. The blade *16a* is arranged to operate in synchronism with the blade *4a* as indicated schematically by the dashed line 19.

Feedback is provided from a tap at the input side of condenser 14 through series connected resistors 20 and 21, and an additional transistor stage 28 to the emitter of transistor 6. More particularly, one end of resistor 21 is connected to the base *28a* of transistor 28 which is the P-N-P type, the emitter *28c* is connected to a negative potential and the collector *28b* is connected to the collector *6b* of transistor 6. A resistor 22 is connected at one end to the common emitter point of transistors 6 and 28 and at the other end to a source of positive potential. Resistor 22 is made relatively large and the positive potential applied thereto is sufficient to maintain the common emitter point at the desired potential.

A portion of the alternating current signal is removed from the feedback by condenser 23 and variable resistor 24 connected in series, resistor 24 being connected into the circuit between resistors 20, 21, and the condenser 23 being connected to ground. The operating point of the amplifier is set at the desired level by adjustment of the base potential by variable potentiometer resistance 25 having one end connected to ground, the tap point connected to the lower end of transformer secondary *5b* and the other end connected to a positive potential.

The use of alternating P-N-P and N-P-N transistors retains the output potential of each stage at approximately the same potential level (but alternating positive and negative), so that a high potential supply is not needed; and also allows direct current feedback to be readily employed.

The feedback has several purposes; first, it stabilizes the operating point of the amplifier to prevent change with ambient temperature variations; second, it is used to reduce the direct current amplification to a low value, while maintaining alternating current amplification, thus making the amplification essentially alternating current, which is desired since the signal to be amplified is alternating current; third, it stabilizes the amplification and preserves the signal wave-form; fourth, it reduces the output impedance of the amplifier, making the performance less dependent on the load; and fifth, it raises the input impedance of the amplifier. These objectives are achieved by using a combination of alternating current and direct current feedback.

The direct current feedback ratio is established by resistor 22, and resistors 20 plus 21. This ratio is made high enough that the gain of the amplifier is reduced to a low value. At the same time, resistor 25 is set at a point which corresponds to the desired operating point of transistor 9. Then, any variation in this operating point will produce a change in the current through resistor 22, in such a direction as to return the operation to the desired point.

In order to prevent simultaneous equal reduction of the alternating current amplification, condenser 23 is used to by-pass the signal-frequency component of the feedback. If resistor 24 were omitted, essentially all signal frequency feedback would be eliminated. However, the desirable objectives of alternating current feedback would then be lost. Therefore, resistor 24 is made to have a minimum value corresponding to the maximum alternating current feedback which will give the desired performance. Then, increasing 24 will decrease the alternating current amplification. Resistor 24 thus serves as the amplifier gain control.

The size of condenser 23 is proportioned to give undistorted amplification at the frequency of commutating switch 4, but to give low amplification below this frequency. This is desirable since the noise per cycle bandwidth generated by the transistors is inversely proportional to frequency.

In many applications, particularly biological, such as in electroencephalography, it is desirable to maintain a high input impedance to an amplifier. In this way, the effective amplification will not be appreciably affected by variations in the resistance of the electrode connections to the subject. Transistors have, however, a low input impedance, usually of the order of 1,000 ohms for base-input connection. The effective amplifier input impedance is multiplied approximately in the ratio of the alternating current feedback employed. Thus, it is readily possible to increase the input impedance to over 100,000 ohms by alternating current feedback as shown.

The symmetrical circuit arrangement of transistor 28 in the inverse feedback circuit and transistor 6 constitutes an inter-related input which function to balance out any change in the characteristic of the amplifier which would otherwise be caused by a change in ambient temperature. In particular, temperature has been found to have two effects on the functioning of a transistor. One such effect is to increase the leakage current from base-to-collector of the transistor. This current will double approximately every ten degrees centigrade. The second effect is to change the base-to-emitter potential required to produce a given collector current. This potential changes approximately five millivolts for every degree centigrade change in transistor temperature. It is possible to substantially reduce the two effects by use of the two transistors 6 and 28 in the balanced circuit shown. Insofar as the product of the resistance of the input circuit and the leakage current of each transistor may be equal there will be a corresponding cancellation of drift due to a change in ambient temperature.

As previously described, resistor 22 is connected at one end thereof to the common emitter point of transistors 6 and 28, and at the opposite end to a source of positive potential (+). In this particular circuit, these two transistors are of the P-N-P type. It may obviously be used equally well with N-P-N type transistors, in which case, all points indicated in the circuit as negative (−) will then be positive (+), and vice versa. Resistor 22 is made relatively large and the positive potential applied to it is sufficient to maintain the common emitter point of the two transistors at the desired potential. To further explain the functioning of this symmetrical circuit in maintaining balance, let it be assumed that the input terminal to base *6a* of transistor 6 is connected directly to ground potential, and that the input terminal to base *28a* of transistor 28 is connected to ground potential through a source of small adjustable potential P. The value of P may now be set so that the potential existing at collector *6c* is the desired operating potential. P is now not further changed.

Under these assumed operating conditions, the emitter *6a* will have a small positive potential difference with respect to the base *6a*; and similarly the emitter *28b* will have a small positive potential with respect to base *28a* of transistor 28. These potential differences will not necessarily be identical in value, differing in fact by the amount of the auxiliary balancing potential P. If it now be assumed that the ambient temperature increases one degree centigrade, this will cause the collector-to-base potential of transistor 28 to decrease approximately 2.5 millivolts. This at the same time requires that the potential drop across resistor 22 increase 2.5 millivolts, thus resulting in a decrease in base-to-emitter potential of transistor 6 of 2.5 millivolts. But insofar as the temperature coefficients of the two transistors are closely identical, this will result in the collector current of transistor 6 remaining at its original value, so that no signal output current is produced by this assumed change in ambient temperature. It is thus seen that the balanced circuit established by transistors 6 and 28 eliminates the effect of the collector-to-base potential temperature coefficient from causing amplifier unbalance.

To the extent that the total resistance represented by the sum of the resistances of resistors 20 and 21 may be equal to the source resistance connected to the base *6a* of transistor 6, and to the extent that the leakage currents of the two transistors 6, 28 are also equal, a similar cancellation effect occurs for this cause. In particular, the potential drops produced respectively by the input resistances at the bases of these two transistors by the leakage current component of the base currents will be equal. Consequently, the potential thereby developed across the input terminals of the two transistors will be the same, and a similar type of cancellation will occur. If the temperature increases, both leakage currents will go up similarly, and the two input potentials will again remain constant, resulting in no output.

In conclusion, while the improved temperature compensating symmetrical transistor circuit has been illustrated as being applied in the circuit of a transistor amplifier with a chopper type of input and inverse feedback, it will be understood that the same symmetrical transistor circuit arrangement can be used equally as well with other types of inputs and other transistor amplifier apparatus with or without provision for feedback.

I claim:

In a symmetrical transistor type amplifier producing an output in response to the difference between two signals, and which is self-stabilizing with respect to change in temperature, the combination comprising first and second transistors of the same polarity type, said transistors each including base, emitter and collector elements, circuit means interconnecting the emitters of said transistors, a resistor element connected in common to said emitters, the connection of said resistor element to said emitters being such that the sum of the currents of said transistors flows therethrough, circuit means connecting a first direct current potential of a selected polarity to said resistor element, circuit means connecting a second direct current potential having a polarity opposite to that of said first potential to the collectors of said transistors, a second resistor element connected between the collector of at least one of said transistors and its respective direct current potential, means connecting the two signals respectively to the bases of said transistors, and an output connection from the collector of one of said transistors to establish a temperature stabilized output representative of the difference between the two signals.

References Cited by the Examiner

UNITED STATES PATENTS

| | | | |
|---|---|---|---|
| 2,772,370 | 11/1956 | Bruce et al. | 307—88.5 |
| 2,846,522 | 8/1958 | Brown | 330—69 X |
| 2,851,542 | 9/1958 | Lohman | 330—17 X |
| 2,863,008 | 12/1958 | Keonjian | 330—17 X |
| 2,916,565 | 12/1959 | Ensink et al. | 330—28 X |

OTHER REFERENCES

Shea text, "Principles of Transistor Circuits," page 351, Fig. 16.11, 1953, John Wiley & Sons, New York City.

NATHAN KAUFMAN, *Acting Primary Examiner.*

ROY LAKE, *Examiner.*